United States Patent
Riche et al.

(10) Patent No.: US 10,416,841 B2
(45) Date of Patent: Sep. 17, 2019

(54) ANIMATED DATA VISUALIZATION VIDEO

(71) Applicant: Microsoft Technology Licensing, LLC, Redmond, WA (US)

(72) Inventors: Nathalie Riche, Issaquah, WA (US); Bongshin Lee, Issaquah, WA (US); Andres Monroy Hernandez, Seattle, WA (US); Fereshteh Amini, Winnipeg (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 632 days.

(21) Appl. No.: 14/822,550

(22) Filed: Aug. 10, 2015

(65) Prior Publication Data
US 2017/0046016 A1    Feb. 16, 2017

(51) Int. Cl.
| G06F 3/0484 | (2013.01) |
| G06F 3/0482 | (2013.01) |
| G06T 13/80 | (2011.01) |
| H04N 21/431 | (2011.01) |
| H04N 21/85 | (2011.01) |
| G06F 3/0486 | (2013.01) |

(Continued)

(52) U.S. Cl.
CPC .......... *G06F 3/0482* (2013.01); *G06F 3/0486* (2013.01); *G06F 3/04842* (2013.01); *G06F 9/451* (2018.02); *G06F 16/4393* (2019.01); *G06T 13/80* (2013.01); *H04N 21/4312* (2013.01); *H04N 21/85* (2013.01); *G06T 2200/24* (2013.01); *G06T 2213/08* (2013.01)

(58) Field of Classification Search
CPC ... G06T 13/80; G06T 11/206; G06T 2200/24; G06T 2213/08; G06F 3/0486

USPC .......................................................... 715/723
See application file for complete search history.

(56) References Cited

U.S. PATENT DOCUMENTS 6,720,979 B1 *  4/2004  Shrader .................. G06T 13/80
                                              345/473
7,737,979 B2    6/2010  Robertson et al.
                    (Continued)

OTHER PUBLICATIONS

"International Preliminary Report on Patentability Issued in PCT Application No. PCT/US2016/043791", dated Sep. 21, 2017, 9 Pages.

(Continued)

*Primary Examiner* — Namitha Pillai
(74) *Attorney, Agent, or Firm* — International IP Law Group, PLLC

(57) ABSTRACT

The claimed subject matter generates animated data visualization videos. A user interface is displayed that includes a clip library panel, a clips panel, and a configurations panel. The clip library panel includes available data clips; the clips panel includes multiple configured data clips; and, the configurations panel includes properties of a selected data clip from the clips panel. A user interface for entering a dataset is displayed. Multiple data clips dragged from the clip library panel to the clips panel, are added to the clips panel. Configuration settings for a dragged and dropped data clip are displayed in the configurations panel. One or more properties of the data clip are updated. An animated data visualization video is generated based on the dragged and dropped data clips and updated properties, and in a sequence specified in the clips panel.

23 Claims, 11 Drawing Sheets

(51) Int. Cl.
G06F 9/451 (2018.01)
G06F 16/438 (2019.01)

(56) References Cited

U.S. PATENT DOCUMENTS

| | | | |
|---|---|---|---|
| 8,024,651 | B1 | 9/2011 | Error |
| 8,195,701 | B1 | 6/2012 | Bums |
| 8,229,735 | B2 | 7/2012 | Robertson et al. |
| 8,543,918 | B2 * | 9/2013 | Margulis ............... G11B 27/34 715/719 |
| 2002/0175917 | A1 | 11/2002 | Chakravarty et al. |
| 2008/0192056 | A1 | 8/2008 | Robertson et al. |
| 2012/0159312 | A1 | 6/2012 | Mital et al. |
| 2012/0313957 | A1 | 12/2012 | Fisher et al. |
| 2015/0113460 | A1 | 4/2015 | High et al. |

OTHER PUBLICATIONS

"Visually", Retrieved on: Jul. 2, 2015 Available at: http://visual.ly/.

"Easelly", Retrieved on: Jul. 2, 2015 Available at: http://www.easel.ly/create/?id=https://s3.amazonaws.com/easel.ly/all_easels/59844/_Filippo_Agostinelli_CV&key=pri.

"Infogram", Retrieved on: Jul. 2, 2015 Available at: https://infogr.am/.

"Tableau", Published on: Jun. 30, 2015 Available at: https://public.tableau.com/s/resources.

"Ooyala", Published on: Oct. 20, 2014 Available at: http://www.ooyala.com/online-video-analytics.

"Rich Chart Server 1.0", Published on: Apr. 15, 2005 Available at: http://www.swftools.com/tools-details.php?tool=9599667260.

"XML/SWF Charts 5.08", Published on: Mar. 27, 2014 Available at: http://www.swftools.com/tools-details.php?tool=2578669648.

Rensch, Miranda., "10 Tools for Creating Infographics and Visualizations", Published on: Feb. 6, 2013 Available at: https://moz.com/blog/10-tools-for-creating-infographics-visualizations.

"Swftool.com", Published on: Dec. 8, 2013 Available at: http://www.swftools.com/tools-category.php?cat=387.

"Swiff Chart Gallery", Retrieved on: Jul. 6, 2015 Available at: http://www.globfx.com/products/swfchart/gallery/.

"Chart Formatting Techniques and Tricks", Retrieved on: Jul. 6, 2015 Available at: http://peltiertech.com/Excel/Charts/format.html.

"Visme", Retrieved on: Jul. 6, 2015 Available at: http://visme.co.

"Beautiful animated infographics and online presentations. Quick and easy", Retrieved on: Jul. 6, 2015 Available at: https://spritesapp.com/intro.

"How to Create an Infographic in 5 Minutes", Retrieved on: Jul. 6, 2015 Available at: http://piktochart.com/how-to-create-infographic-in-5-minutes/.

Heer, et al., "Animated transitions in statistical data graphics", In Proceedings of IEEE Transactions on Visualization and Computer, Nov. 2007, pp. 1240-1247.

Written Opinion of the International Preliminary Examining Authority, issued in PCT Application No. PCT/US2016/043791, dated Jul. 3, 2017, 8 pages.

Heer, et al.; "Animated Transitions in Statistical Data Graphics"; IEEE Transactions on Visualization and Computer Graphics, IEEE Service Center, Los Alamitos, CA, US; vol. 13, No. 6, Nov. 30, 2007; 8 pages.

International Search Report for PCT Application No. PCT/US2016/043791 dated Oct. 19, 2016, 14 pages.

* cited by examiner

FIG. 2

ENTER DATA

PASTE DATA

Paste Data Here!

[Apply] — 204

— 202

— 206

DATA PREVIEW

| Year | Country | Number of Authors | Number of Males | Number of Females | Authors Per Paper |
|------|---------|-------------------|-----------------|-------------------|-------------------|
| 1985 | Japan   | 120               | 70              | 40                | 4                 |
| 1990 | Korea   | 80                | 50              | 17                | 1.7               |
| 1999 | Germany | 99                | 77              | 12                | 2.9               |
| 2000 | US      | 50                | 40              | 7                 | 3                 |
| 2002 | Canada  | 220               | 100             | 80                | 2.5               |
| 2005 | France  | 100               | 60              | 40                | 1.5               |

MY CLIPS

CONFIGURATIONS

200

500

ANIMATED DATA VISUALIZATION VIDEO

BACKGROUND

A data visualization is data presented in a way that demonstrates a series of findings in a dataset. Using charts, pictographs, and the like, data visualizations help make complex data more understandable to the viewer. There exist data visualization toolsets, which help users create data visualizations, such as, pictographs, from data. Pictographs are static images that represent an idea without text or language. For example, instead of using a standard bar to represent book sales per year by a particular publisher, images of stacks of books may replace the standard bars. However, static images limit the ways that data can be represented.

SUMMARY

This summary is not an extensive overview of the claimed subject matter. It is intended to neither identify key elements of the claimed subject matter nor delineate the scope of the claimed subject matter. Its sole purpose is to present some concepts of the claimed subject matter in a simplified form as a prelude to the more detailed description that is presented later.

An implementation provides a system to generate animated data visualization videos. A user interface is displayed that includes a clip library panel, a clips panel, and a configurations panel. The clip library panel includes available data clips; the clips panel includes a series of multiple configured data clips; and, the configurations panel includes properties of a selected data clip from the clips panel. Data clips are short animated data visualization sequences that can be parameterized by a user. A user interface for entering a dataset is displayed. Multiple data clips dragged from the clip library panel to the clips panel, are added to the clips panel. The dragged and dropped data clips can be reordered by dragging and dropping within the clips panel. Configuration settings for a dragged and dropped data clip are displayed in the configurations panel. One or more properties of the data clip can be updated by the user. An animated data visualization video is generated based on the dragged and dropped data clips and updated properties, and in a sequence specified in the clips panel by the user.

Another implementation provides a method for generating animated data visualization videos. A user interface is displayed that includes a clip library panel, a clips panel, and a configurations panel. The clip library panel includes available data clips; the clips panel includes a series of multiple configured data clips; and, the configurations panel includes properties of a selected data clip from the clips panel. A user interface for entering a dataset is displayed. Multiple data clips dragged from the clip library panel to the clips panel, are added to the clips panel. Configuration settings for a dragged and dropped data clip are displayed in the configurations panel. One or more properties of the data clip can be updated by the user. An animated data visualization video is generated based on the dragged and dropped data clips and updated properties, and in a sequence specified in the clips panel by the user.

Another implementation provides a computer-readable storage medium to generate animated data visualization videos. The claimed subject matter generates animated data visualization videos. A user interface is displayed that includes a clip library panel, a clips panel, and a configurations panel. The clip library panel includes available data clips; the clips panel includes a series of multiple configured data clips; and, the configurations panel includes properties of a selected data clip from the clips panel. A user interface for entering a dataset is displayed. Multiple data clips dragged from the clip library panel to the clips panel, are added to the clips panel. Configuration settings for a dragged and dropped data clip are displayed in the configurations panel. One or more properties of the data clip can be updated by the user. An animated data visualization video is generated based on the dragged and dropped data clips and updated properties, and in a sequence specified in the clips panel by the user.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

BRIEF DESCRIPTION OF THE DRAWINGS

FIG. 2 is a block diagram of an example user interface for entering a dataset;

DETAILED DESCRIPTION

Figure 1:
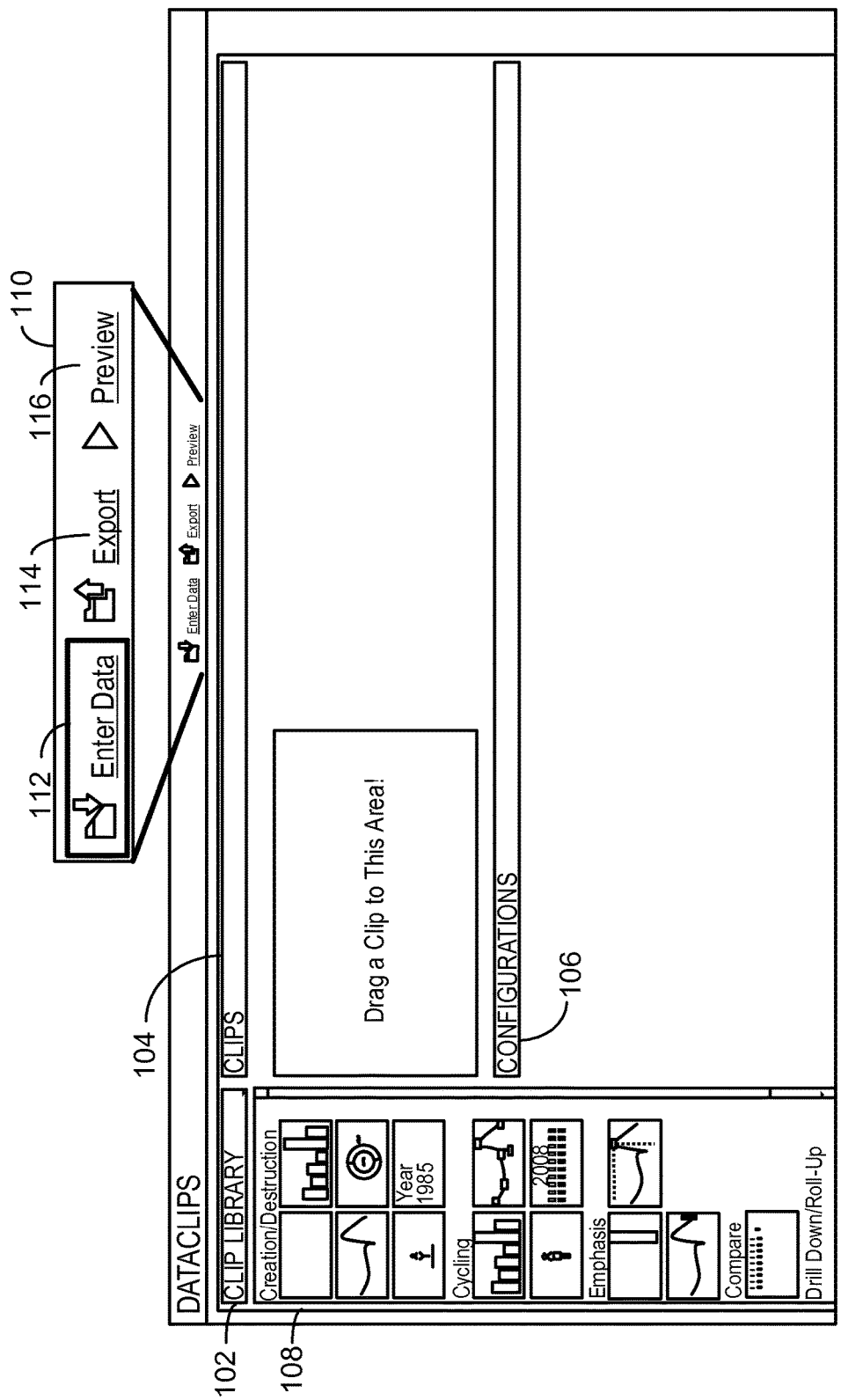
FIG. 1 is a block diagram of an example user interface for animated data visualization videos.

Data visualizations range in complexity from static pictographs shown in simple charts to animated visualizations where charts and graphs morph into other forms. Similarly, approaches to creating data visualizations range from the simple (re-generating the same pictograph multiple times) to the complex (writing computer software to generate animations).

The following describes techniques for generating and editing animated data visualization videos in a single user interface. Animated data visualization videos, as used herein, refer to sequences of animated data visualizations that are combined to create a single, dynamic experience for communicating the findings of a dataset, e.g., statistics, to the viewer. The user interface enables a video author to configure data clips to generate each of the animated data visualizations. Additionally, the user interface enables the video author to sequence the visualizations using drag and drop operations.

As used herein, data clips refer to templates of configurable animations. For example, the user interface may provide a data clip for an animated generation of a bar chart. In such an example, the video author may configure the data clip to generate an animated data visualization where each bar of the bar chart grows vertically to its representative value, and each bar is drawn in succession from left to right. In such an example, the user interface may provide the data clip, and the video author may specify which attributes are used for the bar chart, the colors and widths of the bars, how quickly the bars are drawn, in what order the bars are drawn, and various other parameters to customize the data visualization animation.

The following further describes example implementations such as, the user interface may suggest data clips to incorporate into the video, based on input data. In an embodiment of the claimed subject matter, suggestions for data clips may be selected from a data-driven video corpus maintained by the user interface. The user interface additionally enables the user to configure specific properties of the data clips. The user interface also enables the user to sequence data clips to build a longer data visualization video.

Further, the user interface includes features to create an engaging data-driven video clip. Transitions may be provided for scenarios where successive data clips use the same data. For example, animated transitions are provided between pictograph-like data visualizations and standard charts. Additionally, animated transitions for drill-down, or roll-up actions, between data visualizations are also provided. Other types of animations are also provided, such as animations to create or delete data visualizations. Further animations are provided to guide the viewer to follow findings in the data. Additionally, the data visualizations may include animated annotations. Also, animations are provided for comparing data visualizations.

The user interface also includes features to share the data visualization video. Data clips and data visualization videos may be exported for a web plug-in, as a video in standard formats, such as .mpeg, .mov, output as a separate independent video file, or as a piece of executable code that produces an animation when run. Web plug-ins are software modules that add functionality to a web browser, such as playing a video. Common web plug-ins are the Adobe Flash Player, the QuickTime Player, and the Java plug-in. The executable code may be integrated into hypertext markup language pages or other standardized documents. By exporting in these ways, the data visualization videos can be shared with a variety of audiences.

Figure 11:
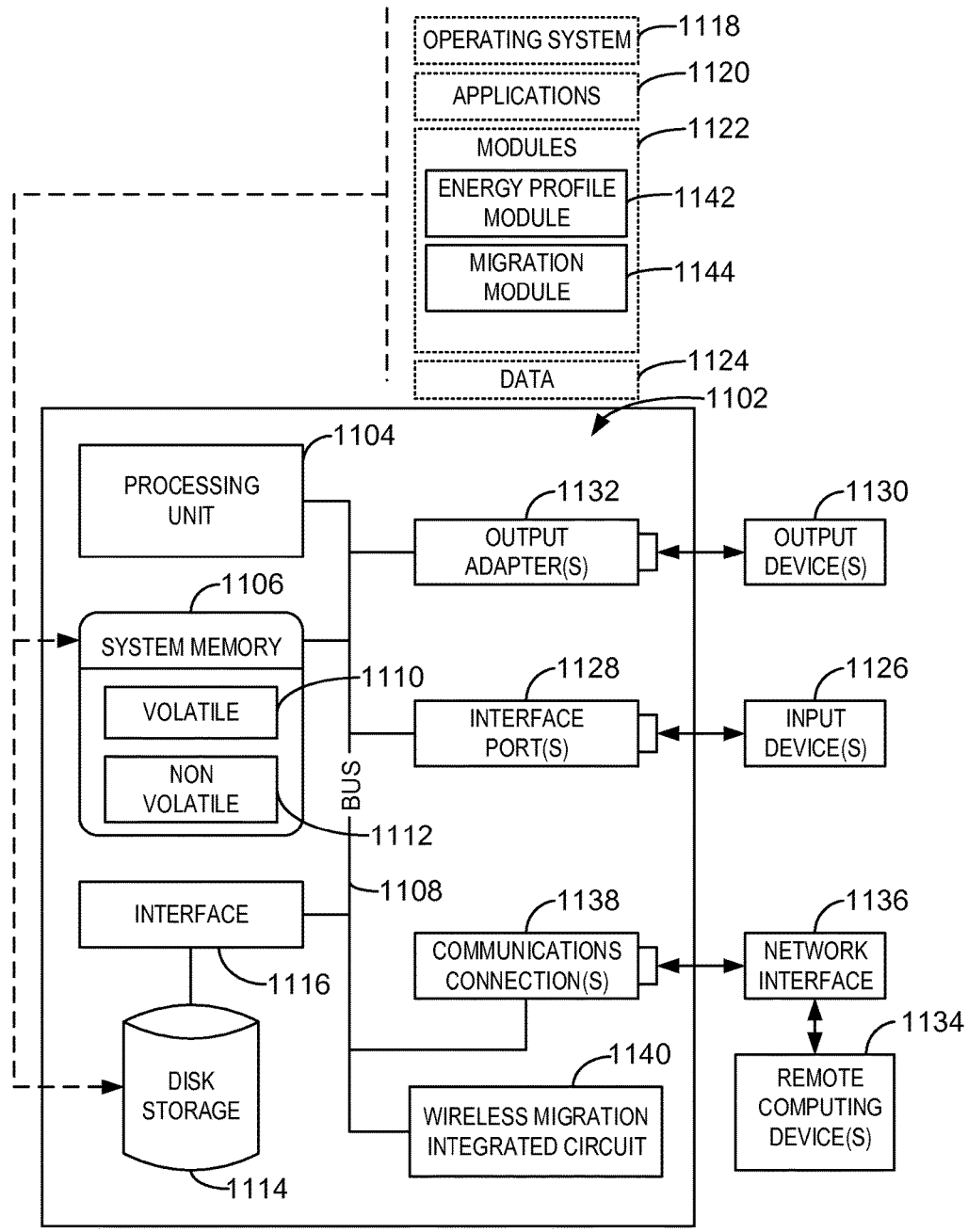
FIG. 11 is a block diagram of an example operating environment configured for implementing various aspects of the techniques described herein.

As a preliminary matter, some of the figures describe concepts in the context of one or more structural components, variously referred to as functionality, modules, features, elements, or the like. The various components shown in the figures can be implemented in any manner, such as software, hardware, firmware, or combinations thereof. In some cases, various components shown in the figures may reflect the use of corresponding components in an actual implementation. In other cases, any single component illustrated in the figures may be implemented by a number of actual components. The depiction of any two or more separate components in the figures may reflect different functions performed by a single actual component. FIG. 11 for example, discussed below, provides details regarding one system that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into multiple component blocks, and certain blocks can be performed in an order that differs from that which is illustrated herein, including a parallel manner of performing the blocks. The blocks shown in the flowcharts can be implemented by software, hardware, firmware, manual processing, or the like. As used herein, hardware may include computer systems, discrete logic components, such as application specific integrated circuits (ASICs), or the like.

As to terminology, the phrase "configured to" encompasses any way that any kind of functionality can be constructed to perform an identified operation. The functionality can be configured to perform an operation using, for instance, software, hardware, firmware, or the like. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may include communication media such as transmission media for wireless signals and the like.

FIG. 1 is a block diagram of an example user interface for animated data visualization videos. The example user interface of FIG. 1 is referred to generally by the reference number 100.

The example user interface 100 enables the video author to generate, and edit, data visualization videos. The user interface 100 provides for the selection and configuration of data clips, and sequencing the animated data visualizations. The example user interface 100 includes three panels: clip library panel 102, clips panel 104, and configurations panel 106. The clip library panel 102 includes the data clips 108 that are available to the video author for inclusion in the animated data visualization video. In some examples, the clips may be organized into sections, with appropriate headings, such as creation, cycling, emphasis, comparison, and drill down. Creation/destruction data clips generate animated data visualizations for creating, or destroying, a data chart before and after its view. These creation/destruction visualizations are aimed at setting up and clearing the view in way that emphasizes certain facts. For example, the creation of the bars in a bar chart can be animated in a staggered manner if an upward trend is being communicated.

Cycling data clips generate animated data visualizations that iterate over a set of data values, e.g., years. Emphasis data clips generate animated data visualizations that highlight specific data values. Comparison data clips generate animated data visualizations that compare different sets of values in the dataset. Drill down and roll-up data clips generate animated data visualizations that either drill down from generalized data to more specific data, or roll up from the specific to the more general.

The clips panel 104 includes, in sequence from left to right, all of the data clips 108 that are in the video being generated. In examples, the video author can drag and drop data clips 108 from the clip library 102 into the clips panel 104 to add a data clip 108 to the video. In some examples, data clips 108 are enabled based on the dataset being used for the video. In other words, if the attributes of the dataset are compatible with a data clip, the data clip is enabled. Being enabled means the data clips 108 are made available for selection in the video. Thus, data clips 108 that are not enabled cannot be dragged and dropped into the clips panel 104. In some examples, data clips 108 shown in gray scale are not enabled. For example, if the dataset being used only has two attributes, only data clips 108 that use two or fewer attributes are enabled. Other compatibilities are also considered when enabling the data clips. Compatibility may also be based on the types of data being used by the data clip and the entered dataset. Additionally, the video author may sequence the data clips 108 in clips panel 104 by dragging and dropping the data clips 108 within the clips panel 104 in the appropriate sequence. The configurations panel 106 enables the user to configure the individual data clips 108 placed in the clips panel 104. In response to a selection of a data clip, the configuration setting for the selected data clip may be shown in the configurations panel 106 for the video author to edit. The configurations panel 106 is described in greater detail with respect to FIGS. 4 and 5.

The user interface 100 also includes a command bar 110, shown in magnified view. The command bar 110 includes three possible selections: enter data hyperlink 112, export hyperlink 114, and preview hyperlink 116. Selecting the export hyperlink 114 enables the video author to export the data visualization video as a web plug-in, or as a video in a standard format. Selecting the preview hyperlink 116 enables the video author to preview the video as it is being generated. In other words, a video is played that includes the data clips 108 currently in the clips panel 104, and based on the currently entered dataset. In some examples, each data clip 108 is previewed after the data clip is dropped in the clips panel 104.

The data visualization animations are populated based on one or more rows of a dataset. Thus, selecting the enter data hyperlink 112 enables the user to enter a dataset, which is described in greater detail with respect to FIG. 2.

FIG. 2 is a block diagram of an example user interface for entering a dataset. The example user interface of FIG. 2 is referred to generally by the reference number 200.

The example user interface 200 may appear overlaid on the example user interface 100. In some examples, the dataset is maintained in tabular format. Accordingly, the dataset can be entered by a copy and paste operation for a delimited collection of rows and columns from another application. In examples, the video author pastes the copied rows into the paste data section 202 of the user interface 200. Alternatively, the video author may enter the dataset by loading a comma separated value file. A comma separated value file is a data file where each record of data is divided into individual attributes by commas. The comma separated value file may be imported from different sources such as a structured query language (SQL) database, other databases, or other storages. In some examples, the video author can specify the comma separated file on a local computer, or a uniform resource locator (url) for the file. When the apply button 204 is selected, the dataset is entered. Additionally, the user interface 200 enables the video author to associate one or more rows of the entered dataset with each of the data clips 108 in the clips panel 104. In some examples, the video author may select one of the data clips 108 in the clips panel 104 before selecting the enter data hyperlink 112. In such examples, the video author may select one or more rows of the dataset and press apply button 204. In this way, the selected rows may be assigned to a data clip 108. Additionally, in some examples, the dataset is parsed to determine the type of rows based on the type of values the rows contain, nominal type rows have text values; categorical type rows have text values that can be categorized into a small number of categories; ordinal type rows have numerical values that can be categorized into a small number of ordered categories; and, numerical type rows have numerical values. Depending on the type of rows, the user interface 200 assigns the rows to dimensions or values to be used in data clips. In other examples, the video author may drag a data row header from the dataset preview 206 into one of the property fields of a data clip.

The data preview section 206 displays the dataset once it is entered. The example dataset in the data preview section 206 includes six rows of data, divided up into 6 attributes: year, country, number of authors, number of male authors, number of female authors, and number of authors per paper. In examples, the video author may edit the values of the dataset in the data preview section 206. Changes to the dataset are also applied to the data clips 108 in the clips panel 104. In other words, the data clips 108 in the clips panel 104 are previewed if affected by a change in the dataset. If a change in the dataset would disable one of the data clips 108 in the clips panel 104, the user interface 100 may display an error message. In some examples, the user interface 100 may generate dummy data to re-enable the data clips 108 in the event of such an error. Example dummy data may include zero values for numeric attributes, spaces for text attributes, and the like.

Figure 3:
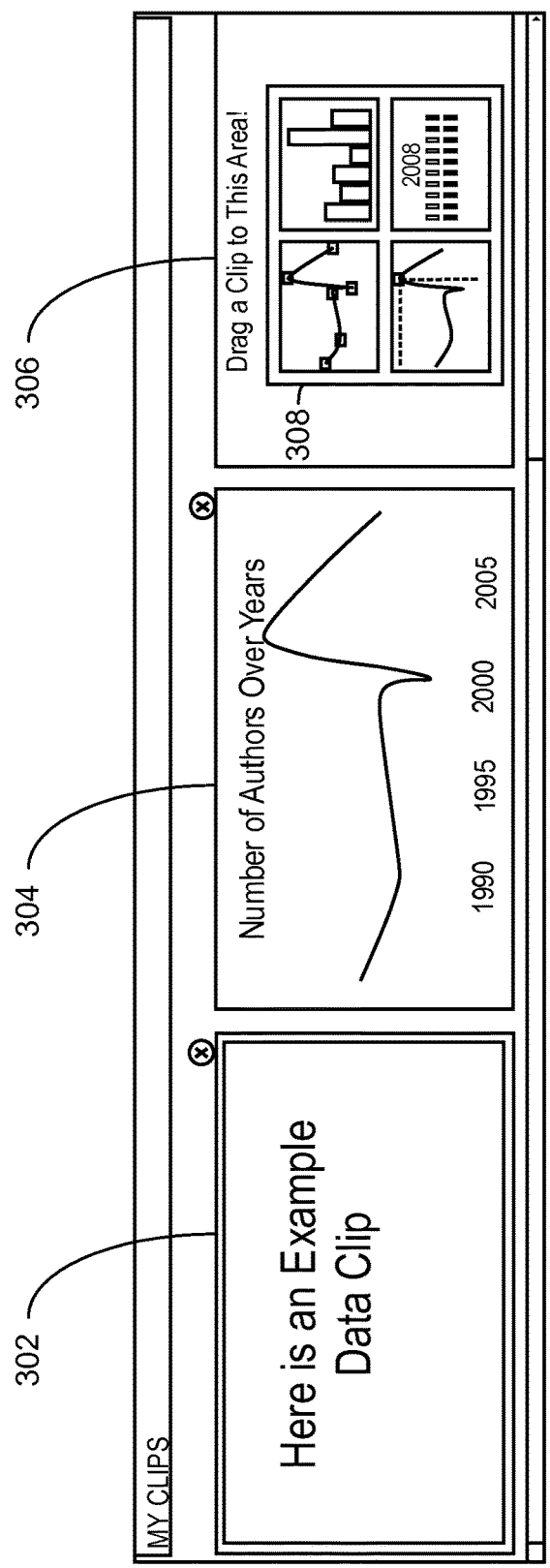
FIG. 3 is a block diagram of an example sequence of data clips 108 for an animated data visualization video.

FIG. 3 is a block diagram of an example sequence of data clips 108 for an animated data visualization video. The example sequence of FIG. 3 is referred to generally by the reference number 300.

The sequence 300 runs from left to right, and includes a text data clip 302, followed by a line graph data clip 304, followed by a suggestion block 306. The data clip 304 appears as populated by the entered dataset described with respect to FIG. 2. In some examples, the user interface 100 makes suggestions for the next data clip in a sequence. In such examples, the suggested data clips 308 may be displayed together in the suggestion block 306, which appears next in the sequence 300.

In some examples, a video corpus database is populated from an analysis of existing animated data visualization videos. The analysis provides information about common practices in the generation of animated data visualization videos. In some examples, the user interface 100 compares the collection of clips in the clips panel 104 with the information in the video corpus database. Accordingly, the user interface 300 may provide video authoring hints based on what is most or least common. For example, the user interface 300 may determine that the video author is repeating a set of facts in two successive data clips 108. Accordingly, the user interface 300 may suggest a data clip 108 to use that has the same data configuration but a different visual representation than the previous data clip 108.

The user interface 300 may also provide statistics surrounding video authoring practices. For example, the user interface 300 may specify the percentage of videos in the video corpus database that use a bar chart after a line chart. Such statistics may appear alongside suggested data clips 310.

In some examples, a hint may pop up if the user selects the same row for a new representation of the data when another representation of the same row has already been created. For example, the video author may use the same row for a line graph data clip as for a bar graph data clip. One possible hint could say, "You have 2 representations of the 'number of authors' over 'year.' Are you sure you want to repeat this representation? If yes, we suggest using a pictographic representation to keep viewers engaged! Should we replace it for you?" The video author could then accept the suggestion, or reject it.

Once a data clip 108 is selected for the video, the video author specifies settings for the selected data clip 108 to aid in generating the animated data visualizations. These settings are specified in the configurations panel.

Figure 4:
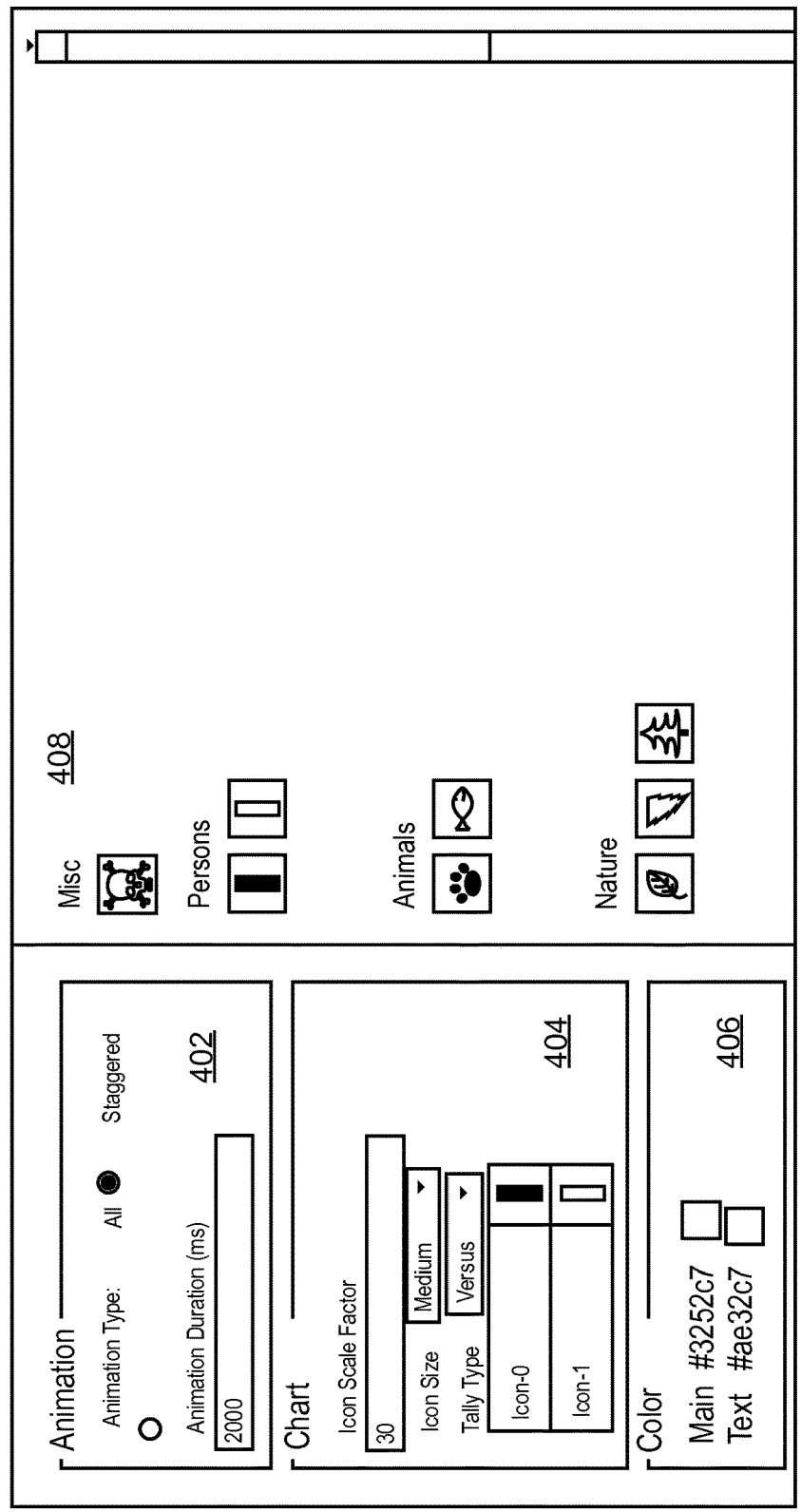
FIG. 4 is a block diagram of a configurations panel for animated data visualization videos.

FIG. 4 is a block diagram of a configurations panel for animated data visualization videos. The example configurations panel is referred to generally by the reference number 400.

Figure 5:
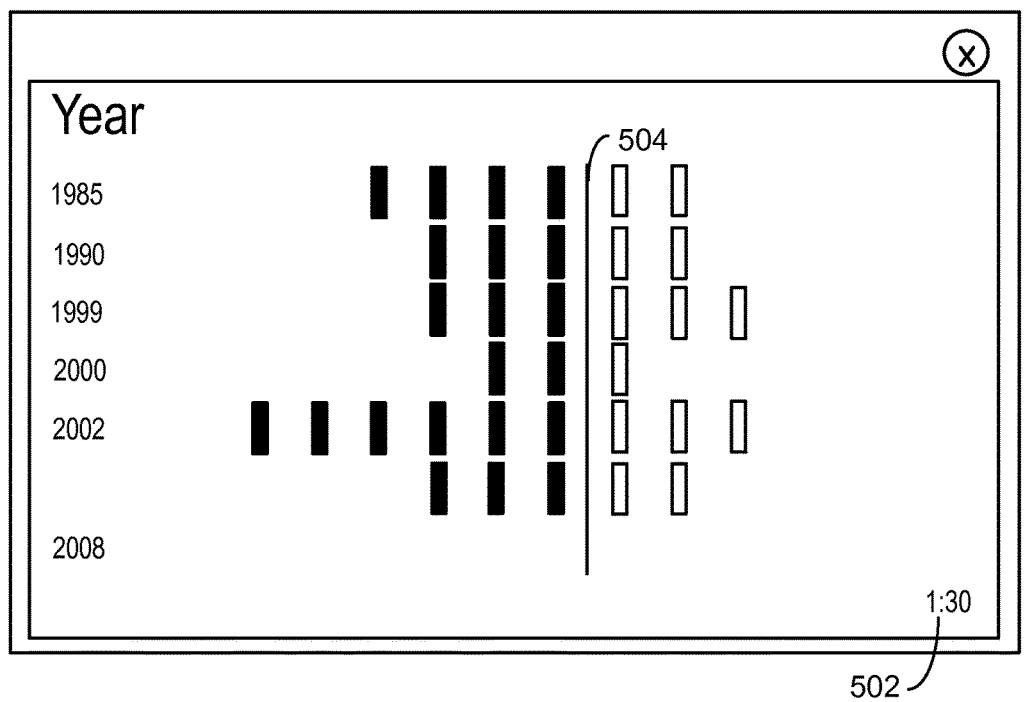
FIG. 5 is a diagram of an example data visualization generated from a comparison data clip.

For the sake of clarity the configurations panel 400 is discussed with respect to FIG. 5, which is a diagram of an example data visualization generated from a comparison data clip. The comparison data clip is one of several data clips in the data clip library 102. The comparison data clip generates data visualizations that aid in comparison by emphasizing the differences in two or more attributes, trends, distributions, and the like. The example data visualization is referred to generally by the reference number 500. The example configurations panel 400 represents the configuration settings for the data visualization 500.

The panel 400 includes a parameters section 402 and a pictograph section 404. The parameters section 402 includes specific settings for the animation of the chart, the chart itself, and the colors of the chart. The animation settings include type and duration. The animation type may determine when the sequence of events occur in the animated visualization. For example, in a creation data clip, bars in a bar chart can appear in a staggered fashion, or all at once. The animation duration may specify how long the animation runs, in milliseconds (ms). The chart settings include icon scale factor, icon size, tally type, Icon-0, and Icon-1. The icon scale factor determines the number of authors that each pictograph, i.e., icon, represents. The icon size is a selection between small, medium, and large. The tally type can be either single: a single data row assigned to a single icon; versus: two rows to be compared assigned to two different icons; or, multiples: n data rows to be compared, each with different assigned icons. Icon-0 and Icon-1 are selected from the pictographs 404, with Icon-0 representing the number of male authors, and Icon-1 representing the number of female authors.

Referring back to FIG. 5, data visualization 500 provides a comparison chart that emphasizes the difference between the number of male versus female authors. The comparison chart includes the year, and a pictographic comparison between the number of male authors, and the number of female authors. Each line of the chart includes the year value, alongside pictographs representing the number of authors. As shown in the legend 502, each pictograph represents 30 authors. In some examples, an animated data visualization is generated for the data clip 500 based on the configuration settings in configuration panel 400. For example, each line of the comparison chart may appear one at a time in sequence. Additionally, the number of icons representing female authors may first appear alongside and on the same side of the comparison divide 504 as the icons representing male authors. Then, the female icons may slide over to the other side of the comparison divide 504 until at the positions shown in the data visualization 500. By showing the male and female icons, first side by side, then across the divide 504, the data visualization 500 emphasizes the difference between the number of male and female authors.

The comparison data clip is one of several data clips provided by the user interface 100 to help the video author create engaging animated data visualizations. Additionally, the user interface 100 may provide transition data clips. Transition data clips generate animated transitions between standard charts and pictographs in successive data visualizations. In such transitions, a graphical element, such as a bar in a bar chart may be split into a set of polygons. The polygons may then morph into pictographs, and move to their location in the data visualization. Similarly, data clips that generate animated transitions from pictographs to standard charts may also be provided.

Figure 6:
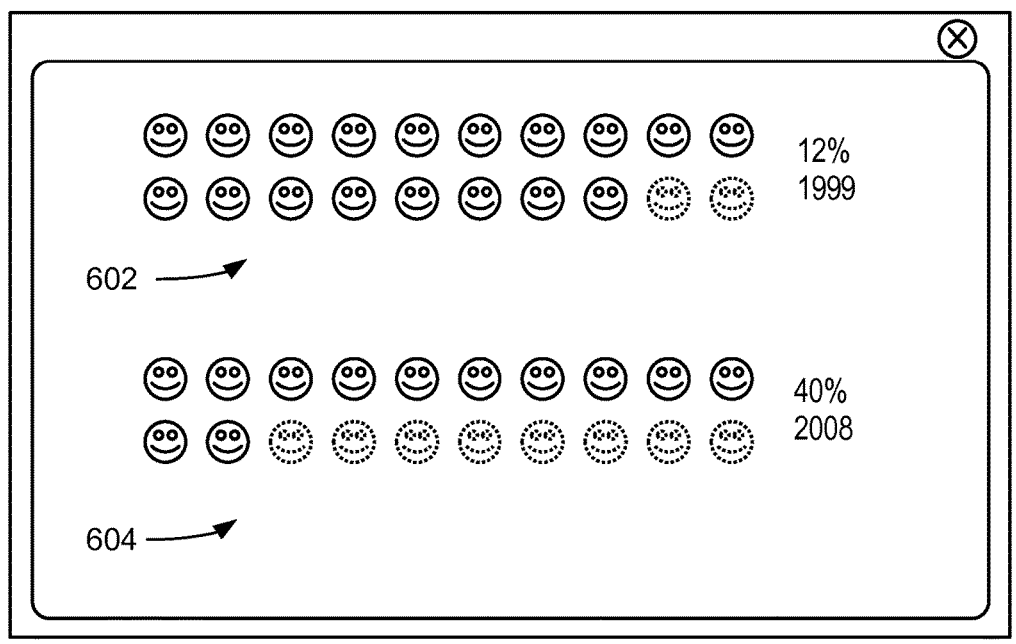
FIG. 6 is a block diagram of an example drill-down data visualization for animated data visualization videos.
Figure 7:
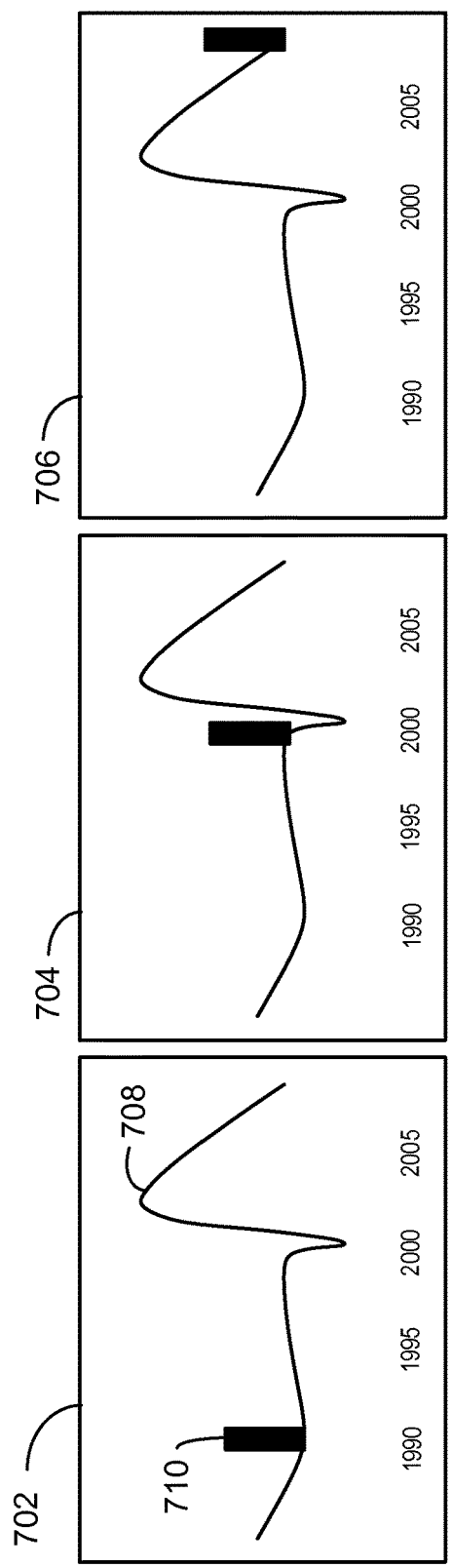
FIG. 7 is a block diagram of an example guide the viewer data visualization for animated data visualization videos.
Figure 8:
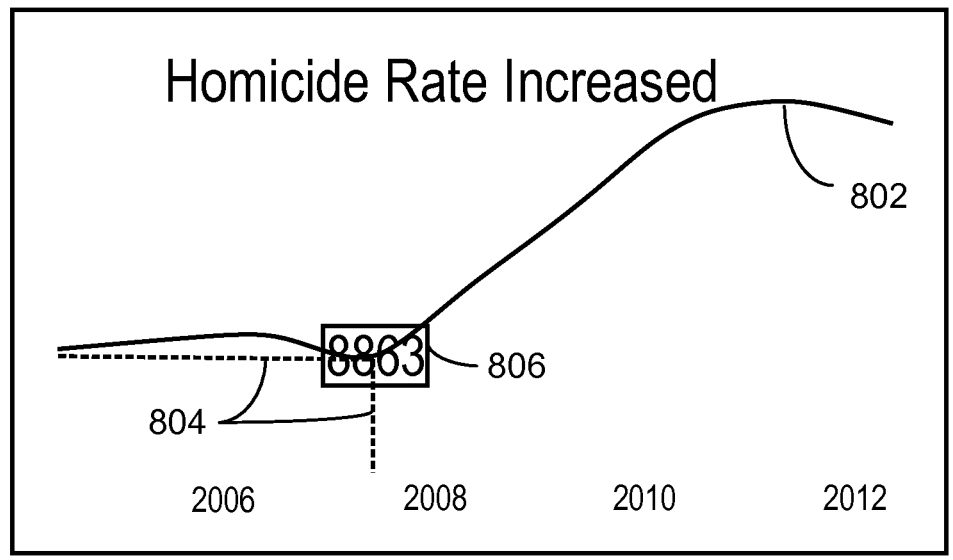
FIG. 8 is a block diagram of an example annotated data visualization for animated data visualization videos.

FIGS. 6-8 are additional examples of types of data visualizations generated by data clips 108 provided by the user interface 100. The types include drill-down/roll-up, guide the viewer, and annotations.

As stated previously, drill-down and roll-up data clips generate animated data visualizations that transition between the general and more specific. In some examples, the drill-down and roll-up data visualizations are supported for up to two different data attributes.

For example, the video author may select a drill-down data clip to transition from a bar chart showing the number of authors by year, and a pictograph showing the number of authors, with the number of females as the drill-down attribute.

FIG. 6 is a block diagram of an example drill-down data visualization for animated data visualization videos. The example data visualization is referred to generally by the reference number 600.

The data visualization 600 includes pictographs 902, 904 for each of the years 1999 and 2008. In pictographs 902, 904, the total number of authors is represented by all of the pictographs for the stated year. The percentage of female authors is represented by the icons with the dotted outlines.

In addition to drill-down data visualizations, the user interface 100 includes data clips that generate animations to guide the viewer's attention. Guiding the viewer's attention may involve using icons in motion so the viewer can understand certain findings in the dataset.

FIG. 7 is a block diagram of an example guide the viewer data visualization for animated data visualization videos. The example data visualization is referred to generally by the reference number 700.

The data visualization 700 shows an animated data visualization for a line graph 708, and includes data visualizations 702, 704, 706. The data visualizations 702, 704, 706 appear successively, so the icon 710 appears to be moving along the line graph 708. In this way, the viewer's attention is guided to follow a trend in the dataset. In some examples, the icon 710 may be paused to emphasize certain values.

Additionally, the user interface 100 includes data clips that animate annotations in the data visualizations. Animated annotations may help bring emphasis to certain findings in the dataset.

FIG. 8 is a block diagram of an example annotated data visualization for animated data visualization videos. The example data visualization is referred to generally by the reference number 800.

Data visualization 800 includes a line graph 802 demonstrating a rise in homicides, with annotations 804, 806. The annotation 804 is a block containing the numeric value of the line graph at the position where the annotation 804 appears. Additionally, annotation 806 brings emphasis to this data point with dotted lines from the x and y-axes. In some examples, the annotation 806 appears as if being drawn from the axes to the data point. In this way, the lower value of the data point is emphasized to bring more attention to the increase shown in line graph 802.

It is understood that annotations 804, 806 are merely examples, and may include any number of other annotations. In some examples, annotations include adding colored shapes, values or explanatory text; making graphical elements within a visualization appear to move, jump, or disappear; as well as, mixed media including urls, images, videos, audio, or other motion and visual effects specified by the video author. Additionally, data visualizations may be annotated with additional lines or icons to shown an average on a bar chart, the normal distribution in a histogram, and showing the difference between two bars in a bar chart with an arrow.

Figure 9:
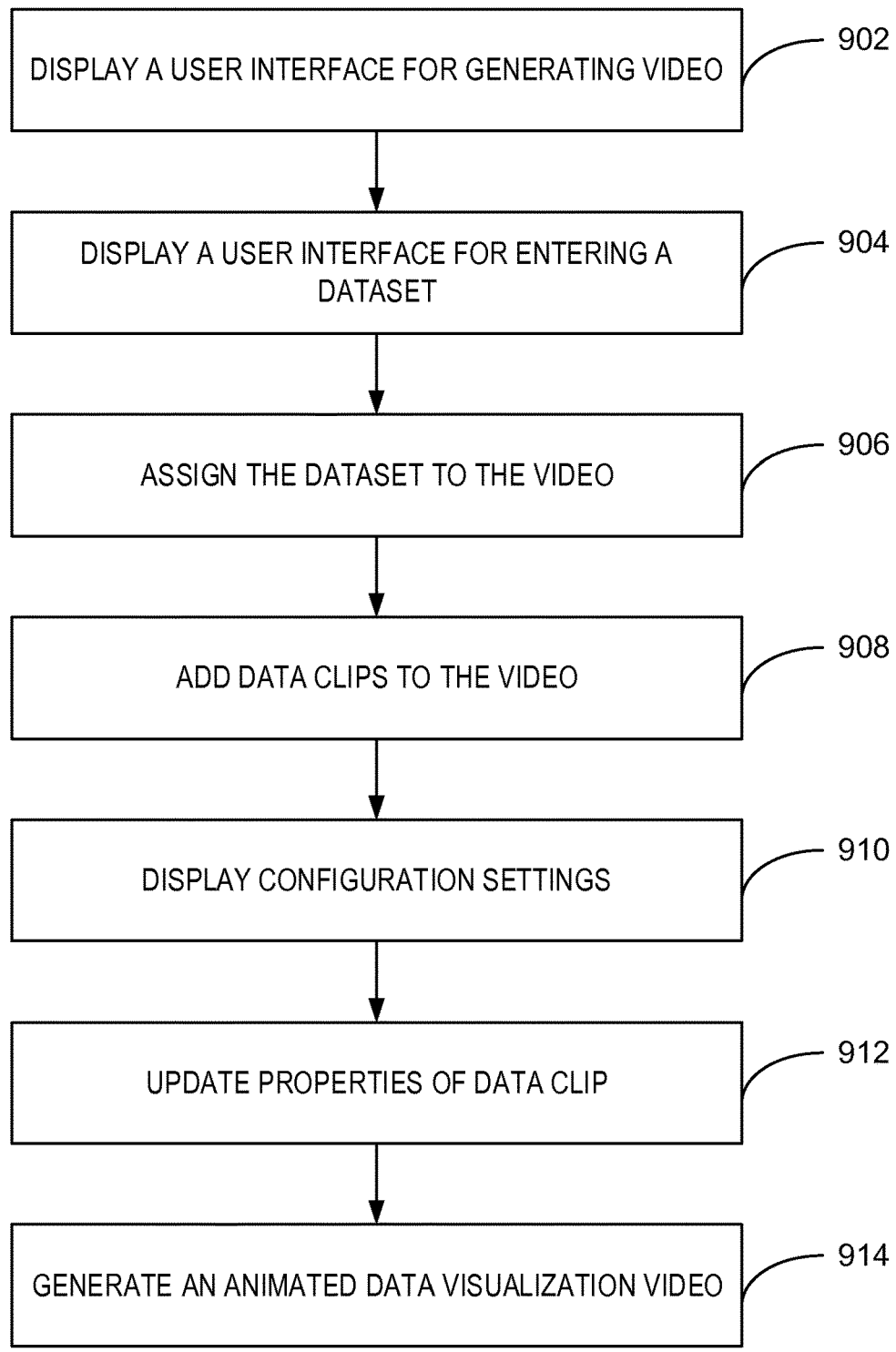
FIG. 9 is a process flow diagram of an example simplified method for animated data visualization videos.

FIG. 9 is a process flow diagram of an example method for animated data visualization videos. The example method 900 is referred to generally by the reference number 900. It is noted that the method 900 does not necessarily follow in the sequence shown. In some examples, the method 900 may be performed in a different order.

In some examples, various aspects of the method may be performed by the user interface 100 or other computing systems discussed herein. The method 900 begins at block 902. Like numbered elements are as described in the description of FIG. 1.

At block 902, the user interface 100 may be displayed for a video author to generate an animated data visualization video. The user interface 100 includes the data clips panel 102, clips panel 104, and configurations panel 106. At block 904, in response to a selection of the enter data hyperlink 112, the user interface 200 may be displayed. As stated previously, the user interface 200 enables the video author to enter a dataset for the animated data visualization video.

At block 906, in response to a drag and drop operation of a data clip 108 from the clip library panel 102 to the clips panel 104, the dragged and dropped data clip 108 is added to the animated data visualization video. Additionally, configuration information for the dragged and dropped data clip is displayed in the configurations panel 106. At block 908, in response to entry of the configuration information, the properties of the data clip are updated.

At block 910, in response to a drag and drop operation of a data clip 108 within the clips panel 104, the data clips of the animated data visualization video are updated. As stated previously, the sequence of the video is represented from left to right in the clips panel 104. The data clips in the clips panel 108 thus can be re-sequenced by dragging and dropping the data clips into the specified order.

At block 912, in response to a selection of the export hyperlink 114, the animated data visualization video may be generated. The video may be generated as a web-plug in, or in a standard video format. The video is generated based on the data clips in the clips panel 104, with the properties specified in the configurations panel 106, and in the specified sequence.

Figure 10:
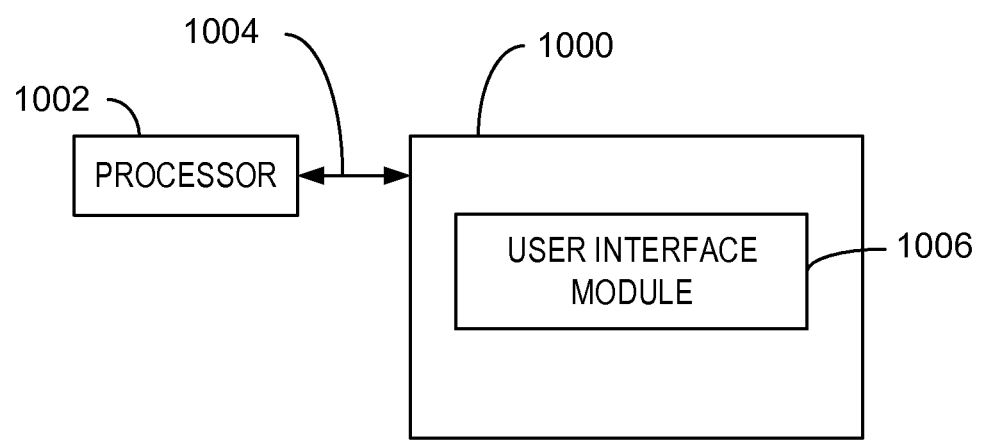
FIG. 10 is a block diagram showing a computer-readable storage medium that can be used to generate animated data visualization videos.

FIG. 10 is a block diagram showing a computer-readable storage medium that can be used to generate animated data visualization videos. The computer-readable storage medium is referred to generally by the reference number 1000.

The tangible, computer-readable storage device 1000 can be accessed by a processor 1002 over a computer bus 1004. Furthermore, the tangible, computer readable storage device 1000 can include code to direct the processor 1002 to perform the current techniques. For example, method 900 can be performed by the processor 1002.

The various software components discussed herein can be stored on the computer-readable storage device 1000, as indicated in FIG. 10. For example, the computer readable storage device 1000 can include a user interface module 1006.

In some implementations, the user interface module 1006 can include code to generate data visualization videos. A user interface may be provided that enables the video author to enter a dataset for the video. The video author interface enables the video author to select data clips for inclusion in a video. The video author interface additionally enables the video author to sequence the data clips in the video. Further, the video author interface enables the video author to configure properties of the data clips in the video. Also, the video author interface generates a video comprising animated data visualizations based on the selected data clips with the specified properties, and in the specified sequence.

It is to be understood that any number of additional software components not shown in FIG. 10 can be included within the tangible, computer-readable storage device 1000, depending on the specific application. Although the subject matter has been described in language specific to structural features and/or methods, it is to be understood that the subject matter defined in the appended claims is not necessarily limited to the specific structural features or methods described above. Rather, the specific structural features and methods described above are disclosed as example forms of implementing the claims.

FIG. 11 is intended to provide a brief, general description of a computing environment in which the various techniques described herein may be implemented. For example, a method and system for generating animated data visualization videos can be implemented in such a computing environment. While the claimed subject matter has been described above in the general context of systems, devices, and methods, the claimed subject matter also may be implemented in combination with other program modules. Generally, program modules include routines, programs, components, data structures, or the like that perform particular tasks or implement particular abstract data types.

FIG. 11 is a block diagram of an example operating environment configured for implementing various aspects of the techniques described herein. The example operating environment is referred to generally by the reference number 1100.

The example operating environment 1100 includes a computer 1102. The computer 1102 includes a processing unit 1104, a system memory 1106, and a system bus 1108.

The system bus 1108 couples system components including, but not limited to, the system memory 1106 to the processing unit 1104. The processing unit 1104 can be any of various available processors. Dual microprocessors and other multiprocessor architectures also can be employed as the processing unit 1104.

The system bus 1108 can be any of several types of bus structure, including the memory bus or memory controller, a peripheral bus or external bus, and a local bus using any variety of available bus architectures known to those of ordinary skill in the art. The system memory 1106 includes computer-readable storage media that includes volatile memory 1110 and nonvolatile memory 1112.

The basic input/output system (BIOS), containing the basic routines to transfer information between elements within the computer 1102, such as during start-up, is stored in nonvolatile memory 1112. By way of illustration, and not limitation, nonvolatile memory 1112 can include read-only memory (ROM), programmable ROM (PROM), electrically programmable ROM (EPROM), electrically erasable programmable ROM (EEPROM), or flash memory.

Volatile memory 1110 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 1102 also includes other computer-readable media, such as removable/non-removable, volatile/nonvolatile computer storage media. FIG. 11 shows, for example a disk storage 1114. Disk storage 1114 includes, but is not limited to, devices like a magnetic disk drive, floppy disk drive, tape drive, Jaz drive, Zip drive, LS-210 drive, flash memory card, or memory stick.

In addition, disk storage 1114 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1114 to the system bus 1108, a removable or non-removable interface is typically used such as interface 1116.

It is to be appreciated that FIG. 11 describes software that acts as an intermediary between users and the basic computer resources described in the suitable operating environment 1100. Such software includes an operating system 1118. Operating system 1118, which can be stored on disk storage 1114, acts to control and allocate resources of the computer 1102.

System applications 1120 take advantage of the management of resources by operating system 1118 through program modules 1122 and program data 1124 stored either in system memory 1106 or on disk storage 1114. It is to be appreciated that the claimed subject matter can be implemented with various operating systems or combinations of operating systems.

A user enters commands or information into the computer 1102 through input devices 1126. Input devices 1126 include, but are not limited to, a pointing device, such as, a mouse, trackball, stylus, and the like, a keyboard, a microphone, a joystick, a satellite dish, a scanner, a TV tuner card, a digital camera, a digital video camera, a web camera, and the like. The input devices 1126 connect to the processing unit 1104 through the system bus 1108 via interface ports 1128. Interface ports 128 include, for example, a serial port, a parallel port, a game port, and a universal serial bus (USB).

Output devices 1130 use some of the same type of ports as input devices 1126. Thus, for example, a USB port may be used to provide input to the computer 1102, and to output information from computer 1102 to an output device 1130.

Output adapter 1132 is provided to illustrate that there are some output devices 1130 like monitors, speakers, and printers, among other output devices 1130, which are accessible via adapters. The output adapters 1132 include, by way of illustration and not limitation, video and sound cards that provide a means of connection between the output device 1130 and the system bus 1108. It can be noted that other devices and systems of devices can provide both input and output capabilities such as remote computers 1134.

The computer 1102 can be a server hosting various software applications in a networked environment using logical connections to one or more remote computers, such as remote computers 1134. The remote computers 1134 may be client systems configured with web browsers, PC applications, mobile phone applications, and the like.

The remote computers 1134 can be a personal computer, a server, a router, a network PC, a workstation, a microprocessor based appliance, a mobile phone, a peer device or other common network node and the like, and typically includes many or all of the elements described relative to the computer 1102.

Remote computers 1134 can be logically connected to the computer 1102 through a network interface 1136 and then connected via a communication connection 1138, which may be wireless.

Network interface 1136 encompasses communication networks such as local-area networks (LAN) and wide-area networks (WAN), as well as wireless local-area networks (WLAN) and wireless wide-area networks (WWAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). WLAN technologies include Wi-Fi (802.11), Bluetooth, and similar protocols while WWAN technologies can include long-term evolution (LTE), universal mobile telecommunications system (UMTS), and other similar protocols.

Communication connection 1138 refers to the hardware/software employed to connect the network interface 1136 to the bus 1108. While communication connection 1138 is shown for illustrative clarity inside computer 1102, it can also be external to the computer 1102. The hardware/software for connection to the network interface 1136 may include, for exemplary purposes, internal and external technologies such as, mobile phone switches, modems including regular telephone grade modems, cable modems and DSL modems, ISDN adapters, and Ethernet cards.

An example processing unit 1104 for the server may be a computing cluster. The disk storage 1114 may comprise an enterprise data storage system, for example, holding thousands of impressions.

The computer 1102 can be configured as a user interface and may also enable generation of animated data visualization videos. The data 1124 may include data clip information, configuration information, the data visualization video, and the video corpus database, for example. In another example, the user interface may be module 1122 shown in the computer 1102 as well.

One or more of applications 1120 may be configured to generate data visualization videos. A user interface may be provided that enables the user to enter a dataset for the video. The user interface enables the user to select data clips for inclusion in a video. The user interface additionally enables the user to sequence the data clips in the video. Further, the user interface enables the user to configure properties of the data clips in the video. Also, the user interface generates a video comprising animated data visualizations based on the selected data clips with the specified properties, and in the specified sequence.

In some examples, some or all of the processes performed for generating the animated data visualization videos can be performed in a cloud service and reloaded on the client computer of the user. For example, some or all of the applications described above for generating the animated data visualization videos could be running in a cloud service and receiving input from a user through a client computer. Thus, the calculations involved in generating the animated data visualization video could be performed on a cloud computing system.

EXAMPLE 1

One example system includes a processor, a memory to store data clips, and a user interface module. The user interface module displays a user interface including a clip library panel, a clips panel, and a configurations panel. The clip library panel includes the data clips. The clips panel includes a set of configured data clips. The configurations panel includes a set of properties of a selected data clip. The selected data clip is selected from the clips panel. The user interface module also displays, in response to an enter data selection, a user interface for entering a dataset for an animated data visualization video. The user interface module additionally assigns the dataset to the video in response to the dataset being entered. Also, the user interface module adds, in response to a drag and drop operation of a plurality of data clips from the clip library panel to the clips panel, the dragged and dropped data clips to the clips panel. The user interface module additionally displays, in response to the drag and drop operation of one of the data clips from the clip library panel to the clips panel, configuration settings for the dragged and dropped data clip in the configurations panel. Further, the user interface module updates, in response to an entry in the configurations panel, one or more properties of the one dragged and dropped data clip. The user interface module also generates, in response to an export video selection, an animated data visualization video based on the dragged and dropped data clips and updated properties, and in a sequence specified in the clips panel. Further, in response to a drag and drop operation of a data clip within the clips panel, the user interface module updates a sequence of the data clips. Also, the user interface module determines a recommended data clip to replace a current data clip. The user interface module displays a hint recommending that the recommended data clip replace the current data clip. Further, the user interface module determines the recommended data clip based on historic data about other animated data visualization videos. Additionally, the user interface module disables one of the data clips if a number of attributes of the entered dataset is less than a number of attributes of the one data clip. Also, the disabled one data clip is not draggable. Further, the animated data visualization video is generated in a standard video format.

EXAMPLE 2

A method for generating an animated data visualization video includes displaying a user interface comprising a clip library panel, a clips panel, and a configurations panel, wherein the clip library panel includes data clips, the clips panel includes a set of configured data clips, and the configurations panel includes a set of properties of a selected data clip, the selected data clip being selected from the clips panel. The method also includes displaying, in response to an enter data selection, a user interface for entering a dataset for an animated data visualization video. The method further includes assigning the dataset to the video in response to the dataset being entered. Additionally, the method includes adding, in response to a drag and drop operation of multiple data clips from the clip library panel to the clips panel, the dragged and dropped data clips to the clips panel. The method further includes displaying, in response to the drag and drop operation of one of the data clips from the clip library panel to the clips panel, configuration settings for the dragged and dropped data clip in the configurations panel. The method additionally includes updating, in response to an entry in the configurations panel, one or more properties of the one dragged and dropped data clip. Also, the method includes generating, in response to a generate video selection, an animated data visualization video based on the dragged and dropped data clips and updated properties, and in a sequence specified in the clips panel. The method additionally includes updating, in response to a drag and drop operation of a data clip within the clips panel, a sequence of the data clips. Further, the method includes determining a recommended data clip to replace a current data clip. Additionally, the method includes displaying a hint recommending that the recommended data clip replace the current data clip. The method also includes determining the recommended data clip based on historic data about other animated data visualization videos. The method further includes disabling one of the data clips if a number of attributes of the entered dataset is less than a number of attributes of the one data clip. The disabled one data clip is not draggable. The animated data visualization video may be generated in a standard video format.

EXAMPLE 3

An example more computer-readable storage media for generating an animated data visualization video includes a plurality of instructions that, when executed by a processor, cause the processor to display a user interface comprising a clip library panel, a clips panel, and a configurations panel, wherein the clip library panel comprises the data clips, the clips panel comprises a set of configured data clips, and the configurations panel comprises a set of properties of a selected data clip, the selected data clip being selected from the clips panel. A user interface for entering a dataset is displayed. Multiple data clips dragged from the clip library panel to the clips panel, are added to the clips panel. Configuration settings for a dragged and dropped data clip are displayed in the configurations panel. One or more properties of the data clip are updated. An animated data visualization video is generated based on the dragged and dropped data clips and updated properties, and in a sequence specified in the clips panel. The plurality of instructions, when executed by the processor, also cause the processor to update, in response to a drag and drop operation of a data clip within the clips panel, a sequence of the data clips. The plurality of instructions, when executed by a processor, further cause the processor to determine a recommended data clip to replace a current data clip, and display a hint recommending that the recommended data clip replace the current data clip. The plurality of instructions additionally cause the processor to determine the recommended data clip based on historic data about other animated data visualization videos. The plurality of instructions, when executed by the processor, also cause the processor to disable one of the data clips if a number of attributes of the entered dataset is less than a number of attributes of the one data clip. The disabled one data clip is not draggable.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A computing system for generating animated data visualization videos, comprising:
   a processor;
   a memory to store data clips, wherein the data clips are templates for animated data visualizations; and
   a user interface module to:
      display a user interface comprising a clip library panel, a clips panel, and a configurations panel, wherein the clip library panel comprises the data clips, the clips panel comprises a set of configured data clips, and the configurations panel comprises a set of properties of a selected data clip, the selected data clip being selected from the clips panel;
      display, in response to an enter data selection, a user interface for entering a dataset for an animated data visualization video;
      add, in response to a drag and drop operation of a plurality of data clips from the clip library panel to the clips panel, the dragged and dropped data clips to the clips panel, the dragged and dropped data clips comprising a cycling data clip to iterate over the dataset of a data chart and an emphasis data clip to highlight at least one data value from the dataset of the data chart;
      update, in response to an entry in the configurations panel, one or more properties of the one dragged and dropped data clip, the updated properties comprising modifying a type of the data chart in response to detecting that the dataset is incorporated in a second data chart of the same type; and
      generate, in response to a generate video selection, the animated data visualization video based on the dragged and dropped data clips and updated properties, and in a sequence specified in the clips panel.

2. The computing system of claim 1, wherein, in response to a drag and drop operation of a data clip within the clips panel, the user interface module updates a sequence of the data clips.

3. The computing system of claim 1, wherein the user interface module:
   determines a recommended data clip to replace a current data clip; and
   display a hint recommending that the recommended data clip replace the current data clip.

4. The computing system of claim 3, wherein the user interface module determines the recommended data clip based on historic data about other animated data visualization videos.

5. The computing system of claim 1, wherein the user interface module:

disables one of the data clips if a number of attributes of the entered dataset is less than a number of attributes of the one data clip.

6. The computing system of claim 5, wherein the disabled one data clip is not draggeable.

7. The computing system of claim 1, wherein the animated data visualization video is generated in a standard video format or in a file, executable by the processor to play the animated data visualization video.

8. A method for generating an animated data visualization video, comprising:
displaying a user interface comprising a clips panel and a plurality of data clips;
displaying, in response to an enter data selection, a user interface for entering a dataset for the animated data visualization video;
adding, in response to a drag and drop operation of one or more data clip to the clips panel, the dragged and dropped data clips to the clips panel, the dragged and dropped data clips comprising a cycling data clip to iterate over the dataset of a data chart and an emphasis data clip to highlight at least one data value from the dataset of the data chart;
updating, in response to an entry in a configurations panel, one or more properties of the one dragged and dropped data clip, the updated properties comprising modifying a type of the data chart in response to detecting that the dataset is incorporated in a second data chart of the same type; and
generating, in response to a generate video selection, the animated data visualization video based on the dragged and dropped data clips, the updated properties, and in a sequence specified in the clips panel.

9. The method of claim 8, comprising:
displaying, in response to a drag and drop operation of one of the data clips to the clips panel, configuration settings for the one dragged and dropped data clip; and
updating, in response to an entry in the configurations panel, one or more properties of the one dragged and dropped data clip; and
generating the animated data visualization video based on the updated properties.

10. The method of claim 8, comprising updating, in response to a drag and drop operation of a data clip within the clips panel, a sequence of the data clips.

11. The method of claim 8, comprising:
determining a recommended data clip to replace a current data clip; and
displaying a hint recommending that the recommended data clip replace the current data clip.

12. The method of claim 10, comprising determining the recommended data clip based on historic data about other animated data visualization videos.

13. The method of claim 8, comprising disabling one of the data clips if a number of attributes of the entered dataset is less than a number of attributes of the one data clip.

14. The method of claim 12, wherein the disabled one data clip is not draggeable.

15. The method of claim 8, wherein the animated data visualization video is generated as an executable file that, when executed, plays the animated data visualization video.

16. One or more computer-readable storage media for generating an animated data visualization video, comprising a plurality of instructions that, when executed by a processor, cause the processor to:
display a user interface comprising a clips panel and a plurality of data clips;
display, in response to an enter data selection, a user interface for entering a dataset for the animated data visualization video;
add, in response to a drag and drop operation of one or more data clips to the clips panel, the dragged and dropped data clips to the clips panel, the dragged and dropped data clips comprising a cycling data clip to iterate over the dataset of a data chart and an emphasis data clip to highlight at least one data value from the dataset of the data chart;
update, in response to an entry for the configurations settings, one or more properties of the one dragged and dropped data clip, the updated properties comprising modifying a type of the data chart in response to detecting that the dataset is incorporated in a second data chart of the same type; and
generate, in response to a generate video selection, the animated data visualization video based on the dragged and dropped data clips and updated properties, and in a sequence specified in the clips panel.

17. The computer-readable storage media of claim 15, wherein the plurality of instructions, when executed by the processor, cause the processor to update, in response to a drag and drop operation of a data clip within the clips panel, a sequence of the data clips.

18. The computer-readable storage media of claim 15, wherein the plurality of instructions, when executed by a processor, cause the processor to:
determine a recommended data clip to replace a current data clip; and
display a hint recommending that the recommended data clip replace the current data clip.

19. The computer-readable storage media of claim 17, wherein the plurality of instructions, when executed by the processor, cause the processor to determine the recommended data clip based on historic data about other animated data visualization videos.

20. The computer-readable storage media of claim 15, wherein the plurality of instructions, when executed by the processor, cause the processor to disable one of the data clips if a number of attributes of the entered dataset is less than a number of attributes of the one data clip.

21. The computer-readable storage media of claim 19, wherein the disabled one data clip is not draggeable.

22. One or more computer-readable storage media for generating an animated data visualization video, comprising a plurality of instructions that, when executed by a processor, cause the processor to:
display a user interface comprising a clips panel, a configuration panel, and a clips library panel comprising a plurality of data clips, the configuration panel comprising a set of properties of a selected data clip, the selected data clip being selected from the clips panel;
displaying, in response to an enter data selection, a user interface for entering a dataset for the animated data visualization video;
adding, in response to a drag and drop operation of one or more data clip from the clip library to the clips panel, the dragged and dropped data clips to the clips panel, the dragged and dropped data clips comprising a cycling data clip to iterate over the dataset of a data chart and an emphasis data clip to highlight at least one data value from the dataset of the data chart;
updating, in response to an entry in the configuration panel, one or more properties of the one dragged and dropped data clip, the updated properties comprising modifying a type of the data chart in response to detecting that the dataset is incorporated in a second data chart of the same type; and generating, in response to a generate video selection, the animated data visualization video based on the dragged and dropped data clips, the updated properties, and in a sequence specified in the clips panel.

23. The computing system of claim 1, wherein the dragged and dropped data clips further comprise a comparison data clip to compare different sets of values in the dataset, a drill down data clip to provide more specific data from the dataset, and a roll up data clip to provide more general data from the dataset.

* * * * *